United States Patent
Holman

(10) Patent No.: US 12,262,082 B1
(45) Date of Patent: Mar. 25, 2025

(54) AUDIENCE REACTIVE MEDIA

(71) Applicant: Apple Inc., Cupertino, CA (US)

(72) Inventor: Tomlinson Holman, Palm Springs, CA (US)

(73) Assignee: Apple Inc., Cupertino, CA (US)

(*) Notice: Subject to any disclaimer, the term of this patent is extended or adjusted under 35 U.S.C. 154(b) by 243 days.

(21) Appl. No.: 17/319,864

(22) Filed: May 13, 2021

Related U.S. Application Data

(60) Provisional application No. 63/052,690, filed on Jul. 16, 2020.

(51) Int. Cl.
| | | |
|---|---|---|
| H04N 21/442 | (2011.01) | |
| G02B 27/01 | (2006.01) | |
| G06N 20/00 | (2019.01) | |
| G10K 15/08 | (2006.01) | |
| H04N 21/422 | (2011.01) | |

(52) U.S. Cl.
CPC ..... *H04N 21/44218* (2013.01); *G02B 27/017* (2013.01); *G06N 20/00* (2019.01); *G10K 15/08* (2013.01); *H04N 21/42203* (2013.01)

(58) Field of Classification Search
CPC ....... H04N 21/44218; H04N 21/42203; G02B 27/017; G06N 20/00; G10K 15/08
See application file for complete search history.

(56) References Cited

U.S. PATENT DOCUMENTS

| | | | |
|---|---|---|---|
| 10,897,647 B1* | 1/2021 | Hunter Crawley | ................ H04N 21/8547 |
| 2002/0073417 A1* | 6/2002 | Kondo | ................ H04N 21/439 348/E7.091 |
| 2003/0035592 A1* | 2/2003 | Cornog | ................ G06T 13/80 345/646 |
| 2014/0229866 A1* | 8/2014 | Gottlieb | ................ H04N 7/15 709/204 |
| 2015/0113408 A1* | 4/2015 | Eppolito | ................ G11B 27/031 715/726 |
| 2019/0090020 A1* | 3/2019 | Srivastava | ................ G11B 27/11 |
| 2021/0274261 A1* | 9/2021 | Sato | ................ H04N 21/4394 |
| 2022/0215821 A1* | 7/2022 | Zheng | ................ G10H 1/0008 |

OTHER PUBLICATIONS

"Meyer Constellation," Livesound, Jan. 1, 2015, 14 pages.
Knox, Mary Tai, et al., "Automatic Laughter Detection Using Neural Networks," INTERSPEECH 2007, 8th Annual Conference of the International Speech Communication Association, Aug. 27, 2007, 4 pages.

\* cited by examiner

*Primary Examiner* — Oschta I Montoya
(74) *Attorney, Agent, or Firm* — Aikin & Gallant, LLP

(57) ABSTRACT

A method for automatically reacting to an audience's vocal reaction during movie playback. A pre-recorded movie is obtained for playback through a display and a speaker. An audience vocal reaction during playback of an original scene in the movie is detected and in response the original scene is lengthened in both picture and sound while playback of the original scene is resumed once the audience vocal reaction has subsided. In another aspect, reverberation is generated in response to and based on the vocal reaction then added as audio output through the speaker, but only until the vocal reaction has ended at which point the added reverberation ends. Other aspects are also described and claimed.

20 Claims, 3 Drawing Sheets

AUDIENCE REACTIVE MEDIA

This non-provisional patent application claims the benefit of the earlier filing date of U.S. provisional application No. 63/052,690 filed Jul. 16, 2020.

FIELD

Aspects of the disclosure here relate to digital processing methods for modifying media such as feature films and tv shows.

BACKGROUND

In live theater, actors pause for audience laughter to pass. In cinema, such pauses have to be built in by the filmmaker. Doing so typically requires trial public screenings with test audiences, in order to determine the best timing for holding for laughter (during the film editing phase). In this manner the majority of audiences are covered, in an average way, for comedic effect.

Moreover, directors have observed that comedies are funnier in a live room than in a dead room (or one that is less lively, or more dead, than the live room.) That is because the laughter reaction by a member of the audience, which produces a particular sound power, will cause a higher sound pressure level in a live room than in a dead room. Over the years, acoustic materials became available such that cinemas could be tuned to have the right amount of reverberation, as speech intelligibility suffers in the presence of too much reverberation while lowering the reverberation time may result in comedies not being perceived as funny. As film sound tracks became more complex with multichannel audio and competition for dialogue intelligibility from music and sound effects, cinemas trended toward reduced reverberation, in order to promote speech intelligibility and localization of sound events. Surround sound accompanied this development so that if a reverberant listening environment was desired for a scene in a film, recorded reverberation could be added to the multi-channel sound track and in particular to the surround channels.

SUMMARY

One aspect of the disclosure here is an audio system that automatically reacts to its audience's vocal reaction, such as laughter. The audience is one or more users of the system, also referred to here as listeners or viewers of a pre-recorded media being played back by the system. The system reacts by lengthening or extending the scene that is being played back (at the time of the audience reaction) in both picture and sound, so that a movie performs like a live theater actor who pauses during audience laughter. Machine learning techniques may be used to configure a processor to detect the audience's vocal reaction, such as laughter, and in response extend the scene, and then resume playback of the movie when the users' laughter gradually subsides. In this manner, each instance of the movie's playback is tuned to the real-time reaction of its particular audience, resulting in a more compelling and unique movie watching experience. This also bridges the gap between live acting in a theater and screen acting for film or cinema, by enabling the movie to be more interactive with its individual audience (closer to what is possible in live theater.)

Another aspect of the disclosure here is an audio system that dynamically (electronically and automatically upon detecting a vocal reaction) adds reverberation content to its audio output, only during the vocal reaction, e.g., laughter. The system may be configured to continually monitor input data, including ambient sound pickup (e.g., through one or more microphones), and if available video output from a camera and bone conduction pickup by a head mounted device, in order to detect the vocal reaction. The system may have a machine learning tool that configures a processor to monitor such input data to extract vocal reaction (e.g., laughter) from the monitored ambient sound pickup, and generates reverberation content based on that extracted vocal reaction. The system then immediately adds the reverberation content into its audio output, for example in addition to reproducing the extracted vocal reaction. In this manner, the one or more users of the system will experience a better feeling of being in a live room (during the vocal reaction.)

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1A:
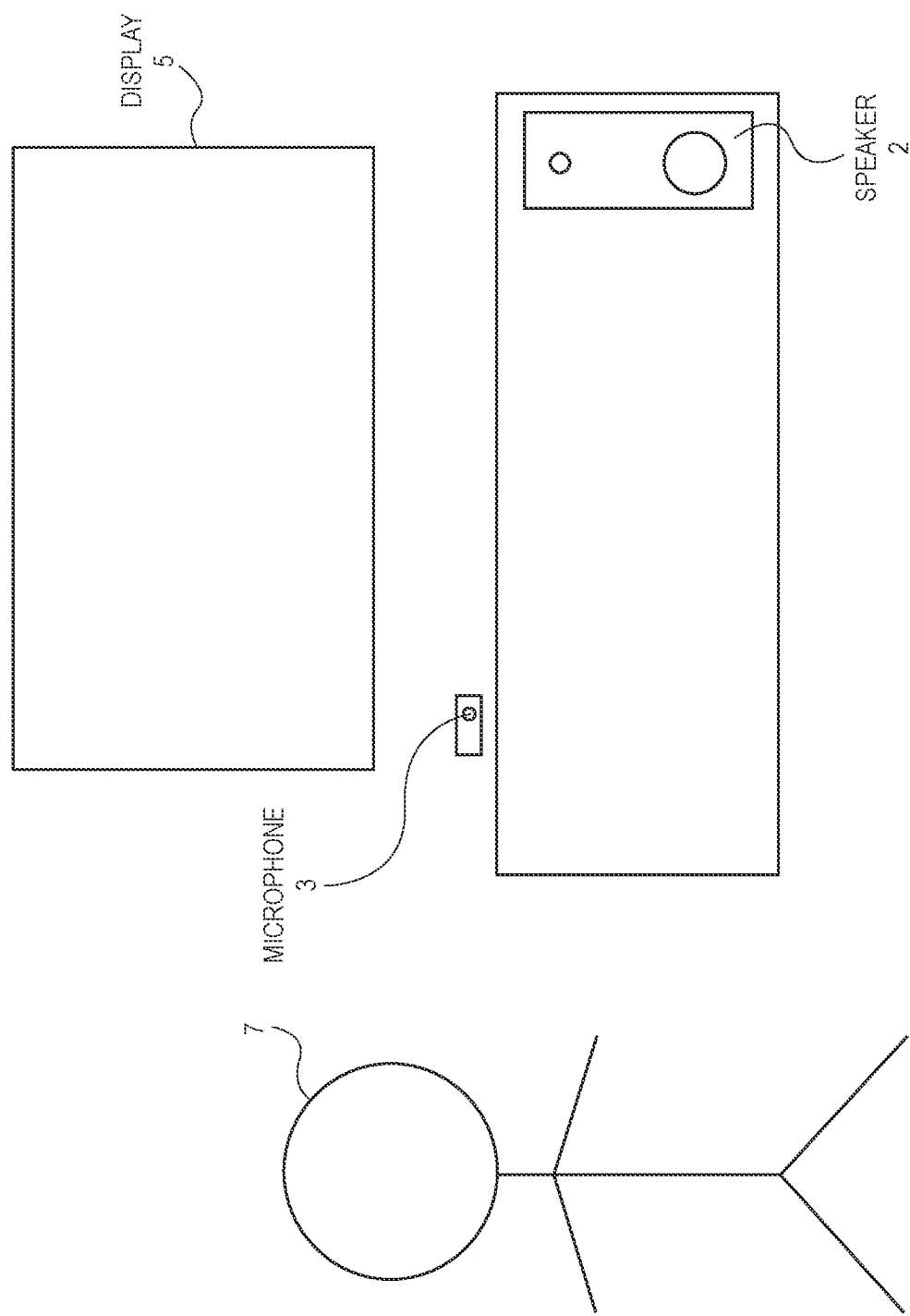
FIG. 1a and FIG. 1b are block diagrams of different types of an audio system.
Figure 1B:
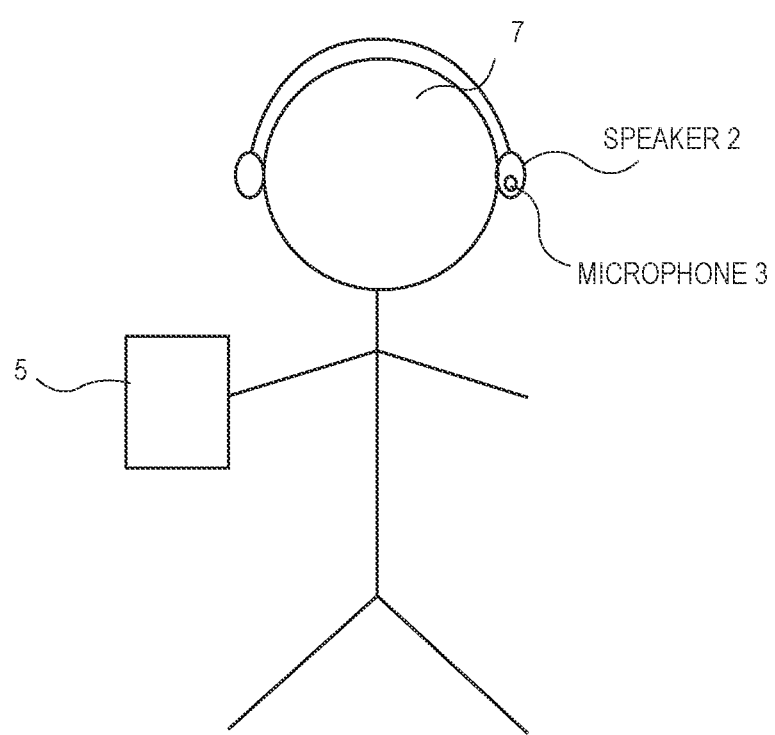

FIG. 1a and FIG. 1b are block diagrams of different types of audio systems. The system in FIG. 1a is configured for a large public cinema or for a small private or home movie theater, in which there is a single display 5 and, for audio output, a speaker 2 (one or more speakers 2), through which a pre-recorded media is being played back by the system for viewing and listening by an audience member 7 (one or more audience members 7.) The term "pre-recorded media"

as used here encompasses various types of audio-visual works including feature films and television shows. The speakers 2 are in this case loudspeakers and may be laid out in accordance with a surround sound layout or a 3D sound layout or an arbitrary layout including being part of a beamforming speaker array. There is also a microphone 3 (one or more microphones 3) whose output signal contributes to an ambient sound pickup channel that is produced by the one or more microphones 3. The microphones 3 can pick up the audible sound field of the audience member 7. In the case of FIG. 1*a*, the microphones 3 are also in the audible sound field produced by the speakers 5 which are loudspeakers. The microphone 3 may be a stand-alone unit although more often it will be integrated into the housings of other devices that are part of the audio system, e.g., a laptop, a smartphone, a tablet, a digital media player, a head mounted display device (worn by a member of the audience), and headphones such as a pair of earbuds or a pair of over the ear or on the ear headphones (worn by a user, also referred to here as the audience member 7). Microphone array beamforming techniques could be used to produce the sound pickup channel.

Alternatively, the system may be configured as shown in FIG. 1*b* where its audio output is through the speakers 2 of a pair of left and right headphones (each headphone having one or more speakers 2), in conjunction with its video output being displayed on the display 5 of a tablet (computer) or a laptop (computer). The term headphone is used generically to refer to any type of against the ear speaker device worn on the head of its user. The sound pickup channel may be produced by one or more microphones 3 which in this case are integrated into one or more of the headphones as shown.

In yet another type of audio system, the display 5 may be integrated into a head mounted display device or it may be part of a detachable display device such as a smartphone that can be mounted to and detached from the head mounted display device (without any tools.) The audience member 7, who is a wearer of the head mounted display device, can watch playback of a pre-recorded media on the display 5, or in the case of an optical head mounted display device they can see a live performance through the display 5. The system's audio output (for listening by the audience member 7) is through the speaker 2, which may be integrated into a pair of headphones, or it may be an extra-aural speaker (a small loudspeaker that is integrated into the head mounted display device), or it may be integrated into a detachable display device (e.g., a small loudspeaker integrated in a smartphone).

The audio system performs the methods described below. The methods may be performed at least in part by one or more programmed or otherwise configurable microelectronic processors that may be solely within a single device such as a digital media player, a micro-console, a network appliance, a television set, a head mounted display device worn by an audience member, a headphone worn by an audience member, a smartphone, a tablet, or a laptop. For example, the microphone and speaker may be integrated in a headphone, or the processor and the memory may be integrated in a laptop, a tablet, a micro-console, a digital media player, or a network appliance.

The performance of a method may be distributed across two or more programmed processors that may or may not be inside the same electronic device housing. In some cases, certain operations of the method are performed in a server machine while others are performed in a client machine, e.g. communicating with each other over the Internet. The methods are thus generically referred to here as being performed by "a" processor of the audio system, meaning one or more processors and perhaps in a distributed manner. The one or more processors are configured (e.g., programmed) according to computer readable instructions stored in a computer-readable storage medium, e.g., one or more solid state microelectronic memories in the same or in different electronic device housings, generically referred to here as "a" memory.

Extending a Scene in Response to Audience Vocal Reaction

Figure 2:
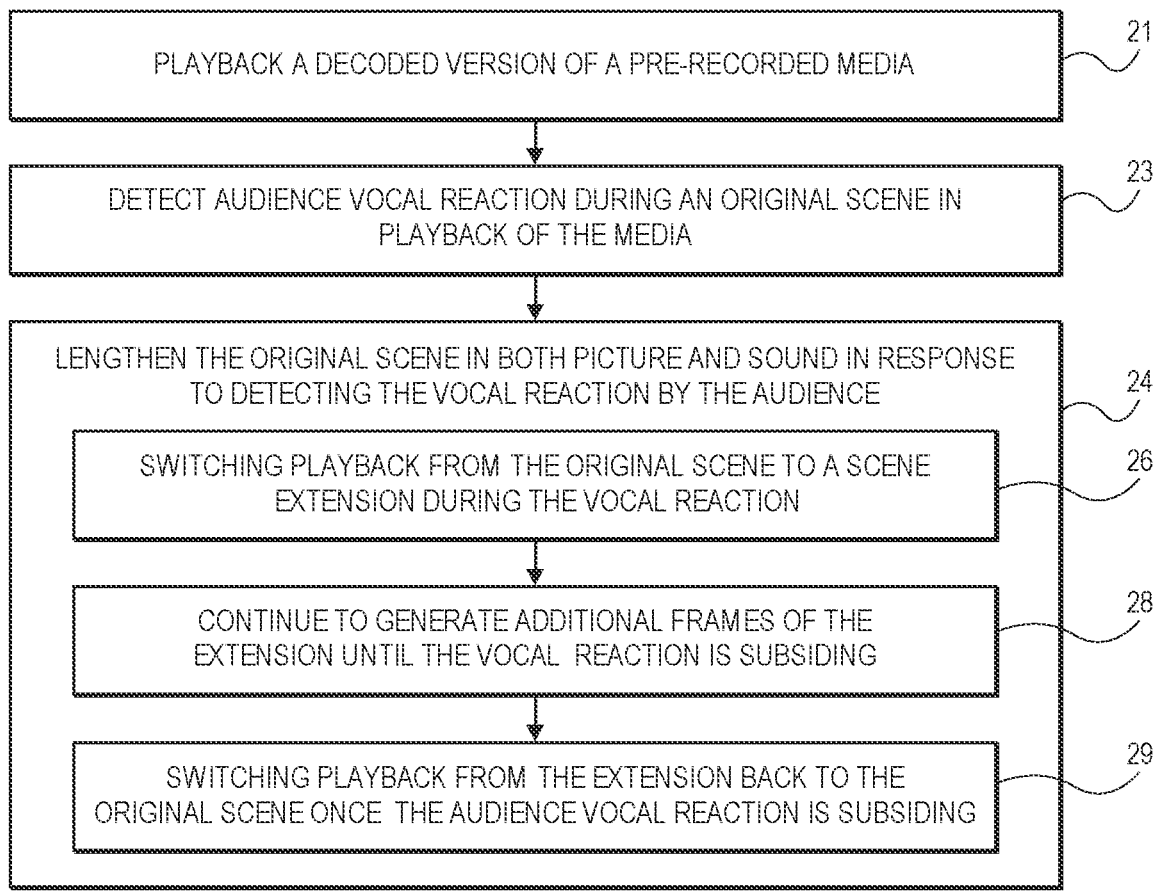
FIG. 2 is a flow diagram of a method for automatically extending a scene in a pre-recorded media in response to audience vocal reaction.

In one aspect of the disclosure here, referring now to the flow diagram of FIG. 2, a processor (and perhaps with the help of other components of an audio system) performs a method in which a scene in a media that is being played back through the display and the speaker of any one of the audio systems of FIG. 1*a* and FIG. 1*b*, is automatically extended in response to audience vocal reaction, thereby tuning each instance of playback of the media to its individual audience. The method begins with the processor obtaining and playing back a decoded version of a pre-recorded media (21.) The media may be a digital movie file such as in MPEG-4 or MPEG-5 HEVC format that is locally stored in the audio system, or that is being streamed over the Internet from a server. As the picture and sound frames (video and audio frames) of an original scene in the decoded movie are being output by the display and the speaker (also referred to here as playback of the media), the processor detects audience vocal reaction (23.) In response, the processor lengthens an original scene (of the media) in both picture and sound (24.) This is done in real-time, e.g., as quickly as possible during the playback which continues uninterrupted from the standpoint of the audience.

The processor generates a scene extension, e.g., additional picture and sound frames or other visual content and audio content. This may be done by a machine learning tool receiving as input i) a decoded version of a pre-recorded movie and ii) the start of the audience vocal reaction, relative to the frame sequence of the decoded version of the movie, and generating as output additional picture and sound frames of the scene extension. The extension is then effectively inserted into the original scene, from the standpoint of the audience during playback (thereby lengthening or extending the original scene.) In other words, the processor switches or transitions playback from the original scene to the scene extension, upon detection of the audience vocal reaction and then also during the audience vocal reaction (26.) In other words, the playback continues with the extension being essentially spliced in. To do so, the processor continues to generate additional frames (for the extension) until the audience vocal reaction subsides (28.) It then resumes playback of the original scene in accordance with a determination (by the processor) that the audio vocal reaction has subsided. For example, the extension ends or fades away while at the same time the original scene resumes or fades in (at the point where playback of the original scene had been paused due to having detected the audience vocal reaction.) In other words, the processor switches playback from the extension back to the original scene once the audience vocal reaction has subsided (29.)

The method thus modifies a media by extending an original scene in the media. In one aspect, the processor lengthens the original scene by continuing to generate additional picture and sound frames for the scene extension until the audience vocal reaction is decaying but has not yet completely subsided. In other words, the processor resumes playback of the original scene as soon as the audience vocal reaction is decaying but has not completely subsided.

In one aspect, in the modified media, the scene dialog is paused in the extension and then resumes (e.g., with an actor's "next line") before the audience vocal reaction (e.g., laughter) has ended. The effect may be similar to when a live theater actor pauses their dialog in response to audience reaction (e.g., laughter) and then fills in the blank by starting to do something other than speaking (e.g., stage business, which refers to activity that is performed by an actor for the effect of extending the scene without delivering a line, that would be masked by laughter, such as the actor crossing their arms, turning their head, or other such action to convince the audience that the frame has not frozen). As soon as the laughter is noticeably decaying, the actor resumes talking with their next line. The machine learning tool may be trained in a similar manner, to not wait for all audience laughter to stop, before resuming playback of the original scene; it resumes the original scene (following the pause) while the audience laughter is decaying, e.g., the actor in the scene enters with a new line while the laughter is decaying. Making such modifications to a movie (perhaps also using the machine learning model to insert a stage business clip) helps propel the story forward in a way that is customized to the specific audience of the movie (and without the overhead associated with performing trial screenings before audiences, to determine the correct timing for adding laughter to the movie).

The machine learning tool may be trained by being given as inputs a number of training movie clips that show various examples of how an original scene unfolds, where the input training movie clips have not yet been edited as a reaction to audience laughter. For each such input, the machine learning tool would also be given an expected output movie clip, in the form of an edited movie clip in which the original scene has been extended (because of audience laughter during playback of the original scene). The machine learning tool could also be "told" what frames (of picture and audio) have been added in order to achieve the extended scene. The machine learning tool will then learn based on such examples how to modify prior, present, and subsequent frames of an input movie clip (frames that are prior to the start of laughter, during decay of the laughter, and subsequent to the laughter) to generate a sequence of new frames that are inserted into the input movie clip to result in the extended scene.

The audience's vocal reaction, e.g., laughter, can be detected using a machine learning tool that is analyzing or processing the sound pickup channel produced by the one or more microphones 3 (that are in the sound field of the audience.) The machine learning tool may also be configured to analyze bone conduction pickup if available, e.g., from a vibration sensor (not shown) that may be integrated in a head mounted display device or in one of the headphones of FIG. 1b, in conjunction with the sound pickup channel, to detect laughter or other type of audience vocal reaction. The machine learning tool may be trained to recognize the audio output including dialog of the pre-recorded movie, as being separate from the audience vocal reaction, as both of which are picked up in the sound pickup channel.

To improve laugh detection accuracy, the sound pickup channel may be an echo cancelled audio signal produced by an acoustic echo canceller, AEC, during the media playback. The AEC serves to reduce any media playback sound (echo) that might also appear in the sound pickup channel, in order to better isolate the audience vocal reaction. As an example, the signal input to the AEC may be one or more microphone signals produced by the microphones 3 (the sound pickup channel), while the so-called reference input to the AEC may be the digital sound track of a pre-recorded movie.

As pointed out above, the input data that is provided to the laugh detection signal processing (including a machine learning tool) may also include video from a camera that is aimed at an audience member's mouth, e.g., a camera mounted to a head mounted display device. In that case, the laugh detection signal processing may include computer vision algorithms including machine learning tools that can detect the likelihood of laughter based on analyzing mouth or other facial gestures of the audience member, and which may help improve the accuracy of the overall laugh detection task being performed by the audio system.

Laugh detection may not be needed in cases where a laugh track is already available as a separate stem or object (e.g., in addition to dialog and music and effects stems) of a pre-recorded movie and in particular television shows. An approximate location (in terms of timing) of a predicted, funny scene in such a pre-recorded movie (e.g., television show) has been marked at which the laugh track should be added. In those cases, the machine learning tool may analyze the marked scene as explained above, to determine the precise location at which to extend the scene, and repositions the laugh track so that playback of the original scene resumes during the decaying phase of the laugh track (but before the laugh track has ended.)

Adding Reverberation to the Audience Vocal Reaction

Figure 3:
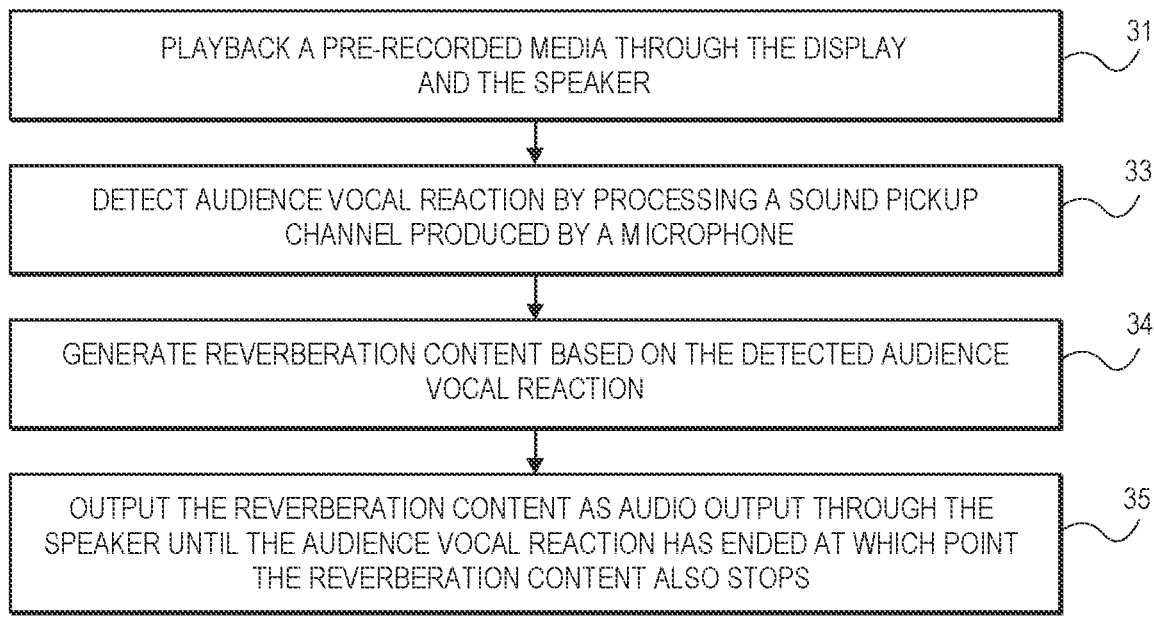
FIG. 3 is a flow diagram of a method for automatically adding reverberation content into audio output in response to detecting a vocal reaction.

In another aspect of the disclosure here, referring now to the flow diagram of FIG. 3, a processor of the audio system adds (e.g., immediately adds) reverberation content to its audio output, as reverberation for and during detected vocal reactions of its audience, but not when the audience is quiet. The method begins with the processor obtaining and playing back a pre-recorded media for playback through the display and the speaker (31), e.g., a decoded version of a movie as described earlier. Note that this operation may be omitted in the case where a user of the audio system (a member of the "audience") is present at a live performance and there is no movie playback. The processor then detects audience vocal reaction, optionally during playback of an original scene in the media, by processing a sound pickup channel produced by the microphone (33.) In response, the processor i) generates reverberation content based on the detected audience vocal reaction (34) and ii) outputs the reverberation content as audio output through the speaker, and optionally to sound of the original scene during playback, until the audience vocal reaction has ended at which point the reverberation content also ends or disappears (36). In one aspect, the processor is configured to extract the vocal reaction and generate the reverberation content based on the extracted vocal reaction, e.g., as artificial reverberation that is applied to or added to the extracted vocal reaction, and the generated reverberation content is output as audio output through the speaker. This effectively increases momentarily the reverberation time of the room in which the audience is watching a movie on a display screen or is present at a live performance, only during audience vocal reactions. In the case where the audience is watching and listening to pre-recorded media, the generated reverberation content remains based on the extracted vocal reaction. In other words, this feature does not reverberate the sound of the scene that is being played back (although the latter could be added separately to also reverberate the sound of the media playback.)

In one instance, if a single member of the audience starts to laugh and this laughter is detected in real-time by the system, then the system responds by producing (e.g., immediately producing) reverberation for such detected laughter (into its audio output for listening by the audience.) In this manner, the audience will not only have a better experience during funny scenes of being in a live room, but they will also benefit from improved intelligibility of dialog in other scenes during which the reverberation is turned off then. The laughter detection schemes described above for the methods that extend a scene (in response to audience vocal reaction) may also be used for the purpose here of adding reverberation to the audience vocal reaction.

In the context of an audio system in which there are several audience members watching the same pre-recorded media whose audio and video are synchronized, for example through their respective head mounted display devices or respective headphones, each member's laughter could be detected separately by the member's head mounted display device or headphone, and then used to digitally produce reverberation that is then combined and reproduced through the respective audio outputs of all of the audience members. In this manner, all of the audience will experience being in a live room together.

In the case of a virtual reality presentation of a pre-recorded movie, or a mixed reality rendering of a live performance which the audience member is watching through their see-through optical head mounted display device, the added reverberation gives the feeling of being in a live virtual room only during times of vocal reaction by an audience member. Reverberation may be added not just to the audio output by a particular member's head mounted display device or headphones (through which laughter by that particular member has been detected), but also to the audio output for other members of the audience (who are also watching the same live performance or pre-recorded movie.) For example, the audio system may be part of a mixed reality system in which several audience members are watching the same live performance by for example a comedian or a concert or other artistic performance, in see-through with their respective optical head mounted display devices.

The following statements may also be used to claim various aspects described above:

1. A method for dynamically adding reverberation to audio output, the method comprising:
    detecting vocal reaction by processing a sound pickup channel produced by a microphone; and
    in response to detecting the vocal reaction, i) generating reverberation content based on the detected vocal reaction and ii) adding the reverberation content, as audio output through a speaker, but only until the vocal reaction has ended at which point the added reverberation ends.

2. The method of statement 1 wherein the vocal reaction is laughter.

3. The method of any one of statements 1-2 further comprising
    playing back a pre-recorded media through a display and a speaker,
    wherein the vocal reaction is that of an audience during playback of a scene in the movie, and the reverberation is added, as audio output through the speaker, to sound of the scene during playback.

4. The method of any one of statements 1-3 wherein detecting the vocal reaction comprises extracting vocal reaction, the method further comprising adding the extracted vocal reaction to the reverberation as audio output through the speaker.

5. The method of any one of statements 1-3 further comprising:
    in response to detecting the vocal reaction, generating a scene extension;
    transitioning the playback from the original scene to the scene extension during the vocal reaction; and then
    resuming playback of the original scene in accordance with a determination that the vocal reaction has subsided.

6. The method of any one of statements 1-5 wherein a machine learning tool detects the vocal reaction.

7. The method of any one of statements 5 or 6 wherein generating the scene extension comprises:
    a machine learning tool receiving as input i) a decoded version of the pre-recorded media and ii) a start of the vocal reaction relative to a frame sequence of the decoded version, and generating as output additional video and audio frames of the scene extension until the vocal reaction is decaying but has not completely subsided, and
    resuming playback of the original scene in accordance with a determination that the vocal reaction is decaying but has not completely subsided.

While certain aspects have been described and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. An audio system comprising:
    a microphone;
    a speaker;
    a display;
    a processor; and
    a memory having instructions stored therein that configure the processor to:
        playback a pre-recorded media through the display and the speaker, wherein the pre-recorded media includes a dialog component;
        detect audience vocal reaction during playback of an original scene in the pre-recorded media by processing a sound pickup channel produced by the microphone; and
        in response to detecting the audience vocal reaction:
            generate new visual content and new audio content for the pre-recorded media;
            extend the original scene by pausing playback of the original scene and beginning playback of the new visual content and the new audio content during the audience vocal reaction, wherein extending the original scene includes pausing the dialog component; and
            end playback of the new visual content and the new audio content and resume playback of the original scene in accordance with a determination that the audience vocal reaction is decaying but has not completely subsided, wherein resuming playback of the original scene includes resuming the dialog component.

2. The audio system of claim 1 wherein the audience vocal reaction is laughter.

3. The audio system of claim 1 wherein an audience comprises one or more users of the system being listeners or viewers of the pre-recorded media, and wherein the instructions further configure the processor to use a machine learning tool to detect the audience vocal reaction.

4. The audio system of claim 1 wherein the instructions further configure the processor to:
generate the new visual content and the new audio content using a machine learning tool that receives as input a decoded version of the pre-recorded media until the audience vocal reaction is decaying but has not completely subsided; and
resume playback of the original scene in accordance with the determination that the audience vocal reaction is decaying.

5. The audio system of claim 1 wherein the display is on a head mounted display device, either integrated in the head mounted display device or a part of a detachable display device.

6. The audio system of claim 1 wherein the instructions further configure the processor to in response to detecting the audience vocal reaction:
generate reverberation content in response to detecting the audience vocal reaction; and
output, through the speaker, the reverberation content during the playback of the new video content and the new audio content.

7. The audio system of claim 1 wherein the instructions comprise a machine learning tool that configures the processor to detect the audience vocal reaction by monitoring input data that includes the sound pickup channel produced by the microphone and at least one other microphone.

8. The audio system of claim 7 wherein the instructions further configure the processor to:
extract, using the machine learning tool, the audience vocal reaction from the input data; and
generate reverberation content based on the extracted audience vocal reaction.

9. A method comprising:
performing playback of a pre-recorded media through a display and a speaker, wherein the pre-recorded media includes a dialog component;
detecting audience vocal reaction during playback of an original scene in the pre-recorded media by processing a sound pickup channel produced by a microphone; and
in response to detecting the audience vocal reaction:
generating new visual content and new audio content for the pre-recorded media;
extending the original scene by pausing playback of the original scene and beginning playback of the new visual content and the new audio content during the audience vocal reaction, wherein extending the original scene includes pausing the dialog component; and
ending playback of the new visual content and the new audio content and resuming playback of the original scene in accordance with a determination that the audience vocal reaction is decaying but has not completely subsided, wherein resuming playback of the original scene includes resuming the dialog component.

10. The method of claim 9 wherein generating the new visual content and the new audio content comprises:
a machine learning tool receiving as input i) a decoded version of the pre-recorded media and ii) a start of the audience vocal reaction relative to a frame sequence of the decoded version, and generating the new visual content and the new audio content until the audience vocal reaction is decaying but has not completely subsided, and
resuming playback of the original scene in accordance with the determination that the audience vocal reaction is decaying but has not completely subsided.

11. The method of claim 10 further comprising:
generating reverberation content in accordance with the detected audience vocal reaction; and
outputting, through the speaker, the reverberation content during the playback of the new video content and the new audio content.

12. The method of claim 11 wherein detecting the audience vocal reaction comprises a machine learning tool monitoring input data that includes the sound pickup channel produced by the microphone and at least one other microphone.

13. The method of claim 12 wherein detecting the audience vocal reaction comprises:
extracting, using the machine learning tool, the audience vocal reaction from the input data; and
generating the reverberation content based on the extracted audience vocal reaction.

14. An audio system that dynamically adds reverberation to its audio output, the system comprising:
a microphone;
a speaker;
a processor; and
memory having instructions stored therein that configure the processor to:
detect a vocal reaction of a user of the audio system by processing a sound pickup channel produced by the microphone; and
in response to detecting the vocal reaction of the user:
generate reverberation content based on the detected vocal reaction;
output, through the speaker, the reverberation content;
perform playback of a pre-recorded media through a display and the speaker, wherein the vocal reaction is detected during playback of an original scene in the pre-recorded media, and the pre-recorded media includes a dialog component; and
in response to detecting the vocal reaction:
generate new visual content and new audio content for the pre-recorded media;
extend the original scene by pausing playback of the original scene and beginning playback of the new visual content and the new audio content during the vocal reaction, wherein extending the original scene includes pausing the dialog component; and
end playback of the new visual content and the new audio content and resume playback of the original scene in accordance with a determination that the vocal reaction is decaying but has not completely subsided, wherein resuming playback of the original scene includes resuming the dialog component.

15. The audio system of claim 14 wherein the reverberation content that is output through the speaker ends when the vocal reaction ends.

16. The audio system of claim 14 wherein the vocal reaction is laughter by the user.

17. The audio system of claim 14 further comprising a display, wherein the memory has further instructions stored therein that configure the processor to:
playback a pre-recorded media through the display and the speaker, wherein the vocal reaction is that of an audience of the system during playback of a scene of the pre-recorded media; and output, through the speaker, the reverberation content and sound of the scene during playback of the pre-recorded media.

18. The audio system of claim 14, wherein generating the reverberation content comprises applying artificial reverberation to the vocal reaction but not to the sound of the scene during playback of the pre-recorded media.

19. The audio system of claim 14 wherein the vocal reaction is that of one or more users of the system being listeners or viewers of the pre-recorded media, and wherein the instructions comprise a machine learning tool that detects the vocal reaction.

20. The audio system of claim 14 wherein the instructions comprise a machine learning tool that generates the new visual content and the new audio content by receiving as input i) a decoded version of the pre-recorded media and ii) a start of the vocal reaction relative to a frame sequence of the decoded version, and generating the new visual content and the new audio content until the vocal reaction is decaying but has not completely subsided; and wherein the processor resumes playback of the original scene in accordance with the determination that the vocal reaction is decaying but has not completely subsided.

\* \* \* \* \*